(12) United States Patent
Yang et al.

(10) Patent No.: US 11,869,124 B2
(45) Date of Patent: Jan. 9, 2024

(54) VISUALIZATION ANALYSIS METHOD OF THE TROPICAL CYCLONE FORECAST VERIFICATION INDEX DATA

(71) Applicants: Shanghai Typhoon Institute of the China Meteorological Administration, Shanghai (CN); Asia-Pacific Typhoon Collaborative Research Center, Shanghai (CN)

(72) Inventors: Mengqi Yang, Shanghai (CN); Guomin Chen, Shanghai (CN); Hui Yu, Shanghai (CN)

(73) Assignees: Shanghai Typhoon Institute of the China Meteorological Administration, Shanghai (CN); Asia-Pacific Typhoon Collaborative Research Center, Shanghai (CN)

( * ) Notice: Subject to any disclaimer, the term of this patent is extended or adjusted under 35 U.S.C. 154(b) by 0 days.

(21) Appl. No.: 18/113,048

(22) Filed: Feb. 23, 2023

(65) Prior Publication Data

US 2023/0281895 A1 Sep. 7, 2023

(30) Foreign Application Priority Data

Apr. 11, 2022 (CN) .......................... 202210374246.X

(51) Int. Cl.
*G06T 11/20* (2006.01)
*G06F 16/26* (2019.01)
(Continued)

(52) U.S. Cl.
CPC ............ *G06T 11/206* (2013.01); *G01W 1/10* (2013.01); *G06F 16/26* (2019.01); *G06Q 10/04* (2013.01); *G06Q 50/26* (2013.01)

(58) Field of Classification Search
None
See application file for complete search history.

(56) References Cited

U.S. PATENT DOCUMENTS 8,160,995 B1 * 4/2012 Crawford ................ G01W 1/10
706/62
2018/0292573 A1 10/2018 Cecelski et al.
(Continued)

FOREIGN PATENT DOCUMENTS

| CN | 102865864 A | 1/2013 |
| CN | 104570161 A | 4/2015 |
| CN | 107992607 A | 5/2018 |

*Primary Examiner* — Yoshihisa Ishizuka
(74) *Attorney, Agent, or Firm* — Zhigang Ma

(57) ABSTRACT

This disclosure relates to the fields of applied meteorology, in particular to a visualization analysis method of the tropical cyclone forecast verification index data, which comprises the following steps: acquiring tropical cyclone data; obtaining a track forecast verification index and an intensity forecast verification index of the tropical cyclone with the tropical cyclone data; obtaining a visible view of the tropical cyclone track forecast error and a visible view of the tropical cyclone intensity forecast error according to the track forecast verification index and the intensity forecast verification index, and in combination with the geographic information of the tropical cyclone; obtaining a first error and a second error according to the track forecast verification index, and obtaining a joint distribution map of the first error and the second error by using the first error and the second error; obtaining a composite box-shaped histogram through the intensity forecast verification index.

8 Claims, 7 Drawing Sheets

(51) Int. Cl.
 *G01W 1/10* (2006.01)
 *G06Q 10/04* (2023.01)
 *G06Q 50/26* (2012.01)

(56) References Cited

U.S. PATENT DOCUMENTS

2022/0057542 A1* 2/2022 Myers .................... G06Q 50/26
2022/0171092 A1* 6/2022 Fitzpatrick .............. G01W 1/10

* cited by examiner

VISUALIZATION ANALYSIS METHOD OF THE TROPICAL CYCLONE FORECAST VERIFICATION INDEX DATA

TECHNICAL FIELD

This document relates to the fields of applied meteorology and the like, and in particular, to a visualization analysis method of the tropical cyclone forecast verification index data.

BACKGROUND

China is one of the countries most seriously affected by tropical cyclones (called typhoons in the Asia-Pacific region) in the world. High-quality typhoon forecasting is essential to reduce the loss of people's lives and property, and typhoon forecast verification is an important part to promote the development of the typhoon forecasting operations.

In terms of verification contents and indexes, many predecessors have made long-term explorations. In order to unify and standardize the contents and indexes of typhoon forecast verification in China, China has formulated the standard of the typhoon forecast verification. Domestic and foreign institutions, such as the Shanghai Typhoon Institute of the China Meteorological Administration, the Joint Typhoon Warning Center, and the Japan Meteorological Agency, will release annual tropical cyclone forecast verification reports. The annual forecast verification of the typhoons in the western North Pacific released by the Shanghai Typhoon Institute also contains more manifestations, such as rose error of the forecast error, Taylor chart, etc. At present, the verification and analysis results at home and abroad focus on the overall performance of the verification indexes, and most of them use average error histograms, line charts, and ordinary box charts as expressions. These expressions are as follows: First, "verification index data, geographic information (latitude and longitude) of the initial time, and actual intensity" are not combined, and the spatial expression and in-depth excavation of verification index data are lacking. Second, the track error can be decomposed into the first error ATE (Along-Track Error) and the second error CTE (Cross-Track Error), and the expression of the joint distribution of ATE and CTE also has defects. Third, although the traditional box chart expresses the distribution of the error samples, it cannot represent the mean absolute error (MAE).

SUMMARY

This disclosure aims to provide a visualization analysis method of tropical cyclone forecast verification index data, which is used to solve the problem of visualization analysis of the tropical cyclone forecast verification index data in the prior art.

The embodiment of this document is realized as follows: This document provides a visualization analysis method of tropical cyclone forecast verification index data, which comprises the following steps: acquiring tropical cyclone data; obtaining a track forecast verification index and an intensity forecast verification index of the tropical cyclone with the tropical cyclone data; obtaining a visible view of the tropical cyclone track forecast error and a visible view of the tropical cyclone intensity forecast error according to the track forecast verification index and the intensity forecast verification index, and in combination with the geographic information of the tropical cyclone; obtaining a first error and a second error according to the track forecast verification index, and obtaining a joint distribution map of the first error and the second error by using the first error and the second error, wherein the first error is the track error of the tropical cyclone along the forward direction, and the second error is the track error of the tropical cyclone perpendicular to the forward direction; obtaining a composite box-shaped histogram through the intensity forecast verification index. This disclosure realizes the expression of the index data on the map, and thus obtains the forecasting characteristics and differences of different typhoons in different stages or different climatic zones by different forecasting methods, and obtains the joint distribution of the first error and the second error under the overall data by using the first error and the second error, highlighting the position error of the sample (i.e. the specified typhoon); at the same time of obtaining the composite box-shaped histogram, the box graph and the histogram are combined together by analyzing the quantile value and the mean value to form a composite box-shaped histogram, which not only reflects a plurality of the analysis indexes, but also expresses the distribution of the error samples and also show the mean value of the absolute errors between forecasted values and observed values; moreover, this disclosure optimizes the traditional graphic statistical method by visually analyzing the index data in the spatial dimension, and optimizes the comparability, legibility and comprehensiveness of the index.

Optionally, the tropical cyclone can be specifically named as typhoon, hurricane, cyclone storm, Baguio wind, formidable wind, and so on in different sea areas. The track is the track of the center movement of the tropical cyclone. The intensity is the maximum average wind speed near the sea surface or near the ground in the center of the tropical cyclone, or the lowest sea level pressure in the center of the tropical cyclone; The forecast verification is to verify the forecast quality by using the best track and the forecast result; Additionally and alternatively, the best track can be specifically selected by referring to the typhoon track and typhoon intensity in Tropical Cyclone Yearbook.

Optionally, the tropical cyclone data includes the best track of the tropical cyclone, the forecasted track of the tropical cyclone, and the intensity data of the tropical cyclone; Additionally and alternatively, obtaining the best track data, the forecasted track data, and the forecasted intensity data can be specifically selected according to the name or number of the tropical cyclone, and the name or number of the tropical cyclone can be specifically selected by reading the tropical cyclone forecast database. The way of reading the data of the tropical cyclone is simple and quick, and the authenticity and reliability of the data source is guaranteed.

Optionally, obtaining the track forecast verification index and the intensity forecast verification index by using the tropical cyclone data comprises the following steps: obtaining the initial position, the forecasted position, the forecasted intensity, the actual position, and the actual intensity of the tropical cyclone by using the tropical cyclone data, wherein the actual position and actual intensity are the actual position and actual intensity of the forecasted position at the corresponding forecast time. Obtaining the track forecast verification index and the intensity forecast verification index according to the initial position, the forecasted position, the actual position, and the actual intensity, respectively. Additionally and alternatively, the track forecast verification index and the intensity forecast verification index meet the national standard requirements, and the standard requirements can specifically select GB/T38308-2019 Weather Forecast Verification for Typhoon.

Optionally, the track forecast verification index data includes position error $\Delta R$, moving direction error $\Delta \alpha$, and moving speed error $\Delta SP$, which are respectively defined by the following formulas:

$\Delta R = 6371 \times \arccos\{\sin \varphi_F \sin \varphi_R + \cos \varphi_F \cos \varphi_R \cos(\lambda_F - \lambda_R)\}$;

$\Delta \alpha = \arccos\{(\cos A - \cos B \cdot \cos C)/(\sin B \cdot \sin C)\}$;

$\Delta SP = 6371 \times \{\arccos B - \arccos C\}/\Delta t$;

wherein, $\cos A = \sin \varphi_F \sin \varphi_R + \cos \varphi_F \cos \varphi_R \cos(\lambda_F - \lambda_R)$;

$\cos B = \sin \varphi_F \sin \varphi_I + \cos \varphi_F \cos \varphi_I \cos(\lambda_F - \lambda_I)$;

$\cos C = \sin \varphi_R \sin \varphi_I + \cos \varphi_R \cos \varphi_I \cos(\lambda_R - \lambda_I)$;

Wherein A is the initial position $A(\varphi_I, \lambda_I)$; B is the forecasted position $B(\varphi_F, \lambda_F)$; C is the actual position $C(\varphi_R, \lambda_R)$; $\Delta R$ is the position error, that is, the distance between the forecasted position $B(\varphi_F, \lambda_F)$ and the actual position $C(\varphi_R, \lambda_R)$, and the unit of said position error is km; $\Delta \alpha$ is the moving direction error, that is, the included angle between the direction from the initial position $A(\varphi_I, \lambda_I)$ to the forecasted position $B(\varphi_F, \lambda_F)$ and the direction from the initial position $A(\varphi_I, \lambda_I)$ to the actual position $C(\varphi_R, \lambda_R)$, and the unit of the moving direction error is azimuth; where $\Delta SP$ is the moving speed error, that is, the difference between the forecasted moving speed and the actual moving speed of the tropical cyclone, and the unit of the moving speed error is kilometers per hour; Parameter 6371 represents the radius of the earth; $\Delta t$ is the forecast time, that is, the time it takes for the tropical cyclone to move from the initial position $A(\varphi_I, \lambda_I)$ to the forecasted position $B(\varphi_F, \lambda_F)$.

Optionally, the intensity forecast verification indexes include absolute error S, average absolute error MAE, relative error S', average relative error MRE, root mean square error RMSE and trend coincidence rate PCT, which respectively meet the following formulas:

$S = |I_k - I_{fk}|$;

$MAE = \frac{1}{N}\sum_{k=1}^{N}|I_k - I_{fk}|$;

$S' = I_{fk} - I_k$;

$MRE = \frac{1}{N}\sum_{k=1}^{N}(I_{fk} - I_k)$;

$RMSE = \left[\frac{1}{N}\sum_{k=1}^{N}(I_{fk} - I_k)^2\right]^{\frac{1}{2}}$;

$PCT = \frac{1}{N}\sum_{k=1}^{N}P_K \times 100\%$;

wherein, $P_K = \begin{cases} 1, & \text{if } (I_k - I_{k0}) \cdot (I_{fk} - I_{fk0}) > 0 \\ 1, & \text{if } (I_k - I_{k0}) = 0 \text{ and } (I_{fk} - I_{fk0}) = 0 \\ 0, & \text{others} \end{cases}$ Where, $I_k$ represents the actual intensity corresponding to the K-th forecast; $I_{fk}$ indicates the forecasted intensity corresponding to the K-th forecast; The absolute error is the absolute value of the difference between the actual intensity and the forecasted intensity; N represents the total forecast times; The relative error represents the difference between the forecasted intensity and the actual intensity; The trend coincidence rate indicates the same sign rate of the change of the actual intensity and the change of the forecasted intensity, and the intensity change is subject to the initial time; $P_K$ is the same number rate; $I_{k0}$ represents the actual intensity at the K-th forecast's initial time; $I_{fk0}$ represents the forecasted intensity at the K-th forecast's initial time. Additionally and alternatively, the unit of the absolute error S is meters per second when verified by the central maximum wind speed forecast of the tropical cyclone. Or the unit of the absolute error S is hPa when verified by the forecast of the lowest sea level pressure at the typhoon center. Further optionally, the unit of the root mean square error RMSE is meters per second when verified by the central maximum wind speed forecast of the tropical cyclone. Or the unit of the root mean square error RMSE is hPa when verified by the forecast of the lowest sea level pressure at the typhoon center.

Optionally, obtaining the visible view of the tropical cyclone track forecast error and visible view of the tropical cyclone intensity forecast error according to the track forecast verification index and the intensity forecast verification index, and in combination with the geographical information of the tropical cyclone, comprises the following steps: respectively defining the drawing standards of the visible view of the tropical cyclone track forecast error and the visible view of the tropical cyclone intensity forecast error; sorting out the track forecast verification index, the intensity forecast verification index, the geographic information, the actual intensity and the actual position; drawing a full track map of the tropical cyclone at any given time on a first observation map by utilizing the best track of the tropical cyclone and in combination with the geographic information; drawing a actual track map of the tropical cyclone on a second observation map by utilizing the best track of the tropical cyclone and in combination with the geographic information; improving the full track map according to the track forecast verification index and the actual position to obtain a visible view of the tropical cyclone track forecast error; improving the actual track map according to the intensity forecast verification index and the actual intensity to obtain the visible view of the tropical cyclone intensity forecast error. The steps of obtaining the visible view of the tropical cyclone track forecast error and the visible view of the tropical cyclone intensity forecast error are clear and concise, which is convenient for making and changing views.

Optionally, the drawing standard of the visible view of tropical cyclone track forecast error includes: a first canvas size, a first horizontal and vertical coordinate, a first observation map, and a legend. The size of that first canvas can be specifically determined according to the range of the tropical cyclone activities. The horizontal coordinate of the first horizontal and vertical coordinate can be specifically defined as longitude, and the vertical coordinate of the first horizontal and vertical coordinate can be specifically defined as latitude. The first observation map can be a local world map of the tropical cyclone track, and the legend includes the legend of the best track, the legend of the forecasted track corresponding to the forecast's initial time A, and the legend of the position error corresponding to the forecast lead time. The legend can be represented by dashed and dotted lines of different colors.

Optionally, improving the full track map according to the track forecast verification index and the actual position to obtain the visible view of the tropical cyclone track forecast error, includes the following steps: selecting a forecast agency or forecast method to obtain the forecasted track of the tropical cyclone at the forecast's initial time A; selecting a forecast lead time B, to obtain a forecasted position corresponding to the forecast lead time B; connecting the forecasted position and the actual position by different lines to obtain a position error line; marking the date and time corresponding to the forecasted position and the actual position; inserting the name and number of the tropical cyclone, the name of the forecast agency or the forecasting method, and the forecast's initial time A; marking the position error at the forecast lead time B corresponding to the forecast's initial time A, to obtain the visible view of the tropical cyclone track forecast error.

Optionally, the drawing standards of the visible view of tropical cyclone intensity forecast error include: a second canvas size, a second horizontal and vertical coordinate, a second observation map, the typhoon intensity grade, the color scale of typhoon intensity grade, and the color scale of the verification index data. Further optionally, the size of the second canvas can be specifically determined according to the range of the tropical cyclone activities, the horizontal coordinate of the second horizontal and vertical coordinate can be specifically defined as longitude, and the vertical coordinate of the second horizontal and vertical coordinate can be specifically defined as latitude. The second observation map can be a local world map of the tropical cyclone track, and the definition of the typhoon intensity grade can specifically select to classify tropical cyclones according to the maximum wind speed near the center of the tropical cyclone. The definition of the color code of the intensity grade can specifically select to define different color codes according to the intensity grade of the typhoon. The verification index color scale can specifically select the maximum value and the minimum value of the verification index data, and set a positive color scale interval and a negative color scale interval. The positive color scale interval can be specifically selected as the gradual warm color tone, and the negative color scale interval can be specifically selected as the gradual cold color tone.

Optionally, obtaining a first error and a second error according to the track forecast verification index, and obtaining a joint distribution map of the first error and the second error by using the first error and the second error, wherein the first error is the track error of the tropical cyclone along the forward direction, and the second error is the track error of the tropical cyclone perpendicular to the forward direction, comprises the following steps: obtaining the first error and the second error by calculating the track forecast verification index; defining a drawing standard of the joint distribution map; obtaining a joint scatter distribution map of the first error and the second error by using the data distribution of the first error and the second error; performing bivariate kernel density estimation on the values of the first error and the second error to obtain bivariate kernel density estimation graphs of the first error and the second error; obtaining a first histogram and a second histogram by using the first error and the second error, respectively; inserting the first histogram and the second histogram into the bivariate kernel density estimation graph, thereby obtaining the overall distribution map of the first error and the second error, superimposing a plurality of the joint scatter distribution maps of the tropical cyclone samples in the overall distribution map to obtain the joint distribution map. Additionally and alternatively, the drawing standard of the joint distribution map includes a third canvas size, a third horizontal and vertical coordinate, the overall scatter color, the sample scatter color, and the bivariate kernel density estimation contour line. Further optionally, the size of the third canvas can be specifically determined according to the range of the tropical cyclone activities, and the third horizontal and vertical coordinate can define the range and interval of the third horizontal and vertical coordinate according to the maximum and minimum values of the first error and the second error, respectively.

Optionally, obtaining the first error and the second error by calculating the track forecast verification index includes the following steps: respectively decomposing the position error in the track forecast verification index into the first error and the second error, wherein the first error and the second error respectively meet the following formula:

$$ATE = \left| \frac{\overrightarrow{OB1\ OB2} \cdot \overrightarrow{OB1\ FC}}{\|\overrightarrow{OB1\ OB2}\|} - \|\overrightarrow{OB1\ OB2}\| \right|;$$

$$CTE = \left| \|\overrightarrow{OB1\ FC}\|^2 - \frac{\left(\overrightarrow{OB1\ OB2} \cdot \overrightarrow{OB1\ FC}\right)^2}{\|\overrightarrow{OB1\ OB2}\|^2} \right|;$$

Wherein ATE is the first error, CTE is the second error, OB1 represents the initial position of the tropical cyclone, FC represents the forecasted position of the tropical cyclone, and OB2 represents the actual position at the corresponding forecast time.

Optionally, obtaining the composite box-shaped histogram by analyzing and processing the intensity forecast verification index, which includes the following steps: defining the drawing standard of the composite box-shaped histogram; obtaining and sorting out the relative error, the average relative error and the average absolute error according to the intensity forecast verification index; selecting the relative error as the first target display parameter, the average relative error as the second target display parameter and the average absolute error as the third target display parameter among the relative error, the average relative error and the average absolute error; obtaining a box chart of the tropical cyclone through the first target display parameter and the second target display parameter, and obtaining a histogram of the tropical cyclone through the third target display parameter; superimposing the box chart and the histogram to obtain the composite graph; improving the composite graph to obtain the composite box-shaped histogram. Further optionally, the drawing standard defining the composite box-shaped histogram includes a fourth canvas size, the fourth horizontal and vertical coordinate, a box-shaped graph attribute, a histogram attribute, the legend of the first target display parameter, the legend of the second target display parameter, and the legend of the third target display parameter. Further optionally, the size of the fourth canvas can be specifically determined according to the range of the tropical cyclone activities; the horizontal coordinate of the fourth horizontal and vertical coordinate can be specifically selected as the number of the tropical cyclone, and the vertical coordinate of the fourth horizontal and vertical coordinate can be specifically selected as the intensity error of the tropical cyclone. The definition of box-shaped graph attribute includes: box width, box line width, box line color, box filling color, the definition of abnormal value shape, and abnormal value filling color. The definition of the histogram includes the width and color of the histogram; Further optionally, the width of the histogram is larger than the width of the box body.

To sum up, the visualization analysis method of tropical cyclone forecast verification index data of this disclosure deepens the application and value of the forecast verification system in practical operational forecasting, helps forecasters to master the characteristics of the forecast errors, improves the accuracy of fine typhoon forecast, and at the same time, enhances the influence of China on the technical innovation of the tropical cyclone forecast verification system. Moreover, this disclosure can open up new ideas for various data analysis and be applied to data analysis in different fields.

In order to make the above-mentioned objects, features and advantages of this application more obvious and understandable, the following optional embodiments will be described in detail with reference to the attached drawings.

BRIEF DESCRIPTION OF THE DRAWINGS

In order to explain the technical scheme of the embodiment of this application more clearly, the following drawings that need to be used in the embodiment will be briefly introduced. It should be understood that the following drawings only show some embodiments of this application, so they should not be regarded as a limitation of the scope. For those of ordinary skill in the art, other relevant drawings can be obtained according to these drawings without any creative effort.

DETAILED DESCRIPTION

The technical solutions in the embodiments of this application will be described clearly and completely below with reference to the drawings in the embodiments of this application. It is obvious that the described embodiments are only part of the embodiments of this application, but not all of them. Based on the embodiments in this application, all other embodiments obtained by ordinary technicians in the art without creative labor belong to the scope of protection in this application.

Figure 1:
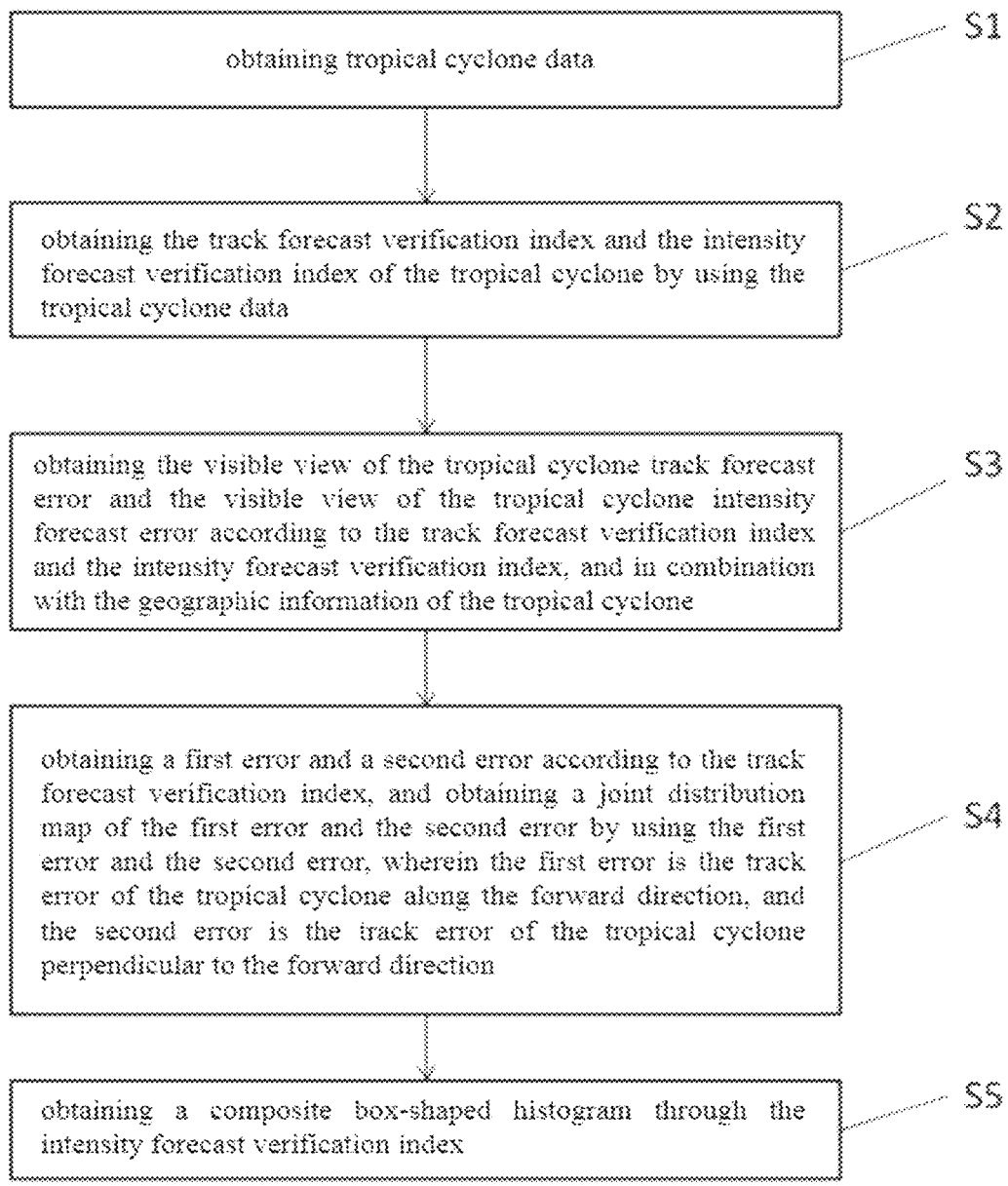
FIG. 1 shows a flow chart of visualization analysis method for tropical cyclone forecast verification index data.

Please refer to FIG. 1. In one embodiment, this disclosure provides a visualization analysis method of the tropical cyclone forecast verification index data, which includes the following steps: S1, obtaining tropical cyclone data.

In yet another alternative embodiment, the acquisition of the tropical cyclone data can be specifically realized by the name or number of the tropical cyclone, and by reading the best track data of the tropical cyclone and the tropical cyclone forecast database. The tropical cyclone best track data can be selected from the typhoon track and typhoon intensity in the typhoon yearbook data compiled by the Shanghai Typhoon Institute of the China Meteorological Administration. The best track data of the tropical cyclone can be specifically obtained through the China Typhoon Website, and the tropical cyclone forecast database can be specifically selected as the global tropical cyclone forecast database of the Shanghai Typhoon Institute of the China Meteorological Administration.

Specifically, in this embodiment, the tropical cyclone data includes the best track of the tropical cyclone, the forecasted track of the tropical cyclone, and the intensity data of the tropical cyclone. Furthermore, tropical cyclone can be specifically named as typhoon, hurricane, cyclone storm, Baguio wind, formidable wind, and so on in different sea areas.

In yet another embodiment, the visualization analysis method of the tropical cyclone forecast verification index data further comprises the following steps: S2, obtaining the track forecast verification index and the intensity forecast verification index of the tropical cyclone by using the tropical cyclone data.

In an optional embodiment, obtaining the track forecast verification index and intensity forecast verification index of the tropical cyclone by using the tropical cyclone data comprises the following steps: obtaining the initial position, the forecasted position, the forecasted intensity, the actual position, and the actual intensity of the tropical cyclone by using the tropical cyclone data, wherein the actual position and actual intensity are the actual position and actual intensity of the forecasted position at the corresponding forecast time; obtaining the track forecast verification index and the intensity forecast verification index respectively according to the initial position, the forecasted position, the actual position, and the actual intensity.

In detail, in this embodiment, the track of the tropical cyclone is the track of the center movement of the tropical cyclone; the intensity of the tropical cyclone is the maximum average wind speed near the sea surface or near the ground in the center of the tropical cyclone, or the lowest sea level pressure in the center of the tropical cyclone. The best track and forecast results can be specifically utilized to verify the forecast quality. The best track can be specifically selected and referred to as the typhoon track and typhoon intensity in Tropical Cyclone Yearbook. The track forecast verification index and the intensity forecast verification index meet the national standard requirements, and the standard requirements can be specifically selected as GB/T38308-2019 Weather Forecast Verification for Typhoon.

Figure 2:
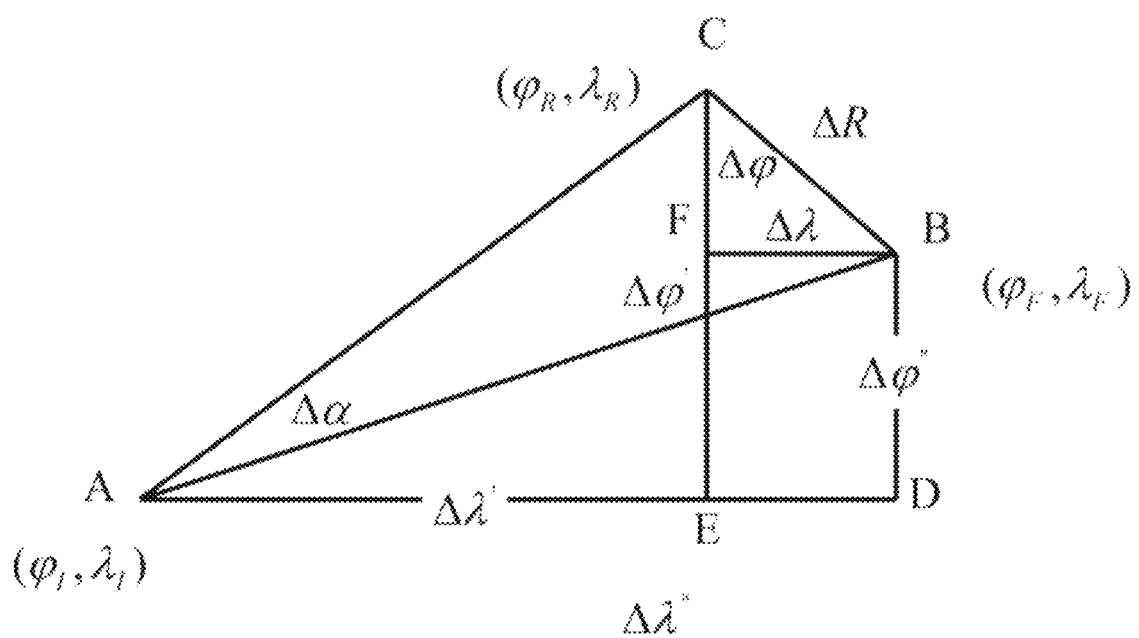
FIG. 2 shows a schematic chart for solving position error, moving direction error, and moving speed error.

Moreover, please refer to FIG. 2. in another embodiment, the track forecast verification index data includes position error $\Delta R$, moving direction error $\Delta \alpha$, and moving speed error $\Delta SP$, which are respectively defined by the following formulas:

$$\Delta R = 6371 \times \arccos\{\sin \varphi_F \sin \varphi_R + \cos \varphi_F \cos \varphi_R \cos(\lambda_F - \lambda_R)\};$$

$$\Delta \alpha = \arccos\{(\cos A - \cos B \cdot \cos C)/(\sin B \cdot \sin C)\};$$

$$\Delta SP = 6371 \times \{\arccos B - \arccos C\}/\Delta t;$$

wherein, $\cos A = \sin \varphi_F \sin \varphi_R + \cos \varphi_F \cos \varphi_R \cos(\lambda_F - \lambda_R);$ $\cos B = \sin \varphi_F \sin \varphi_I + \cos \varphi_F \cos \varphi_I \cos(\lambda_F - \lambda_I);$ $\cos C = \sin \varphi_R \sin \varphi_I + \cos \varphi_R \cos \varphi_I \cos(\lambda_R - \lambda_I);$ Wherein A is the initial position $A(\varphi_I, \lambda_I)$; B is the forecasted position $B(\varphi_F, \lambda_F)$; C is the actual position $C(\varphi_R, \lambda_R)$; $\Delta R$ is the position error, that is, the distance between the forecasted position $B(\varphi_F, \lambda_F)$ and the actual position $C(\varphi_R, \lambda_R)$, and the unit of said position error is km; $\Delta \alpha$ is the moving direction error, that is, the included angle between the direction from the initial position $A(\varphi_I, \lambda_I)$ to the forecasted position $B(\varphi_F, \lambda_F)$ and the direction from the initial position $A(\varphi_I, \lambda_I)$ to the actual position $C(\varphi_R, \lambda_R)$, and the unit of the moving direction error is azimuth; where ΔSP is the moving speed error, that is, the difference between the forecasted moving speed and the actual moving speed of the tropical cyclone, and the unit of the moving speed error is kilometers per hour; Parameter 6371 represents the radius of the earth; Δt is the forecast time, that is, the time it takes for the tropical cyclone to move from the initial position $A(\varphi_I, \lambda_I)$ to the forecasted position $B(\varphi_F, \lambda_F)$.

In yet another embodiment, specifically, the intensity forecast verification indexes include absolute error S, average absolute error MAE, relative error S', average relative error MRE, root mean square error RMSE and trend coincidence rate PCT, which respectively meet the following formulas:

$$S = |I_k - I_{fk}|;$$

$$MAE = \frac{1}{N}\sum_{k=1}^{N}|I_k - I_{fk}|;$$

$$S' = I_{fk} - I_k;$$

$$MRE = \frac{1}{N}\sum_{k=1}^{N}(I_{fk} - I_k);$$

$$RMSE = \left[\frac{1}{N}\sum_{k=1}^{N}(I_{fk} - I_k)^2\right]^{\frac{1}{2}};$$

$$PCT = \frac{1}{N}\sum_{k=1}^{N}P_K \times 100\%;$$

$$\text{wherein, } P_K = \begin{cases} 1, & \text{if } (I_k - I_{k0}) \cdot (I_{fk} - I_{fk0}) > 0 \\ 1, & \text{if } (I_k - I_{k0}) = 0 \text{ and } (I_{fk} - I_{fk0}) = 0 \\ 0, & \text{others} \end{cases}$$

Where, $I_k$ represents the actual intensity corresponding to the K-th forecast; $I_{fk}$ indicates the forecasted intensity corresponding to the K-th forecast; The absolute error is the absolute value of the difference between the actual intensity and the forecasted intensity; N represents the total forecast times; The relative error represents the difference between the forecasted intensity and the actual intensity; The trend coincidence rate indicates the same sign rate of the change of the actual intensity and the change of the forecasted intensity, and the intensity change is subject to the initial time; $P_K$ is the same number rate; $I_{k0}$ represents the actual intensity at the K-th forecast's initial time; $I_{fk0}$ represents the forecasted intensity at the K-th forecast's initial time. Moreover, the unit of the absolute error S is meters per second when verified by the central maximum wind speed forecast of the tropical cyclone. Or the unit of the absolute error S is hPa when verified by the forecast of the lowest sea level pressure at the typhoon center. Further, in this embodiment, the unit of the root mean square error RMSE is meters per second when verified by the central maximum wind speed forecast of the tropical cyclone. Or the unit of the root mean square error RMSE is hPa when verified by the forecast of the lowest sea level pressure at the typhoon center.

In one embodiment, the visualization analysis method of the tropical cyclone forecast verification index data also includes the following steps: S3, obtaining the visible view of the tropical cyclone track forecast error and the visible view of the tropical cyclone intensity forecast error according to the track forecast verification index and the intensity forecast verification index, and in combination with the geographic information of the tropical cyclone.

Specifically, in one embodiment, obtaining the visible view of the tropical cyclone track forecast error and visible view of the tropical cyclone intensity forecast error according to the track forecast verification index and the intensity forecast verification index, and in combination with the geographical information of the tropical cyclone, comprises the following steps: S31, respectively defining the drawing standards of the visible view of the tropical cyclone track forecast error and visible view of the tropical cyclone intensity forecast error. In detail, in this embodiment, the drawing standard of the visible view of the tropical cyclone track forecast error includes the first canvas size, the first horizontal and vertical coordinate, and the first observation map and the legend. Specifically, in this embodiment, the first canvas size can be specifically determined according to the range of the tropical cyclone activities, the horizontal coordinate of the first horizontal and vertical coordinate can be specifically defined as longitude, the vertical coordinate of the first horizontal and vertical coordinate can be specifically defined as latitude, and the first observation map can be a local world map of the tropical cyclone track; The legend includes the legend of the best track, the legend of the forecasted track corresponding to the forecast's initial time A, and the legend of the position error corresponding to the forecast lead time. Furthermore, the legend can be represented by dotted or solid lines of different colors.

More specifically, in this embodiment, in the legend, the legend of the best track can specifically select a solid yellow line; the forecasted track corresponding to the forecast's initial time can be selected as the red dashed line. The legend of the position error corresponding to the forecast lead time can be selected in different colors according to different forecast lead times. The color selection in this embodiment is for reference only. In detail, the legend of the position error corresponding to the forecast lead time can be selected as 24 hour, 48 hour and 72 hour, among which the position error corresponding to the 24 hour forecast lead time can be represented by a green dotted line, the position error corresponding to the 48 hour forecast lead time can be represented by a blue dotted line and the position error corresponding to the 72 hour forecast lead time can be represented by a purple dotted line. The drawing standards of the visible view of the tropical cyclone intensity forecast error include: the second canvas size, the second horizontal and vertical coordinate, the second observation map, the typhoon intensity grade, the color scale of the typhoon intensity grade, and the color scale of the verification index data. More specifically, in this embodiment, the second canvas size can be specifically determined according to the range of the tropical cyclone activities, the horizontal coordinate of the second horizontal and vertical coordinate can be specifically defined as longitude, and the vertical coordinate of the second horizontal and vertical coordinate can be specifically defined as latitude. The second observation map can be a local world map of the tropical cyclone track, and the definition of the typhoon intensity grade can select to classify tropical cyclones according to the maximum wind speed near the center of the tropical cyclone. The definition of the color code of the intensity grade can select to define different color codes according to the intensity grade of the typhoon. The verification index color scale can be selected to set a positive color scale interval and a negative color scale interval by the maximum value and the minimum value of the verification index data. The positive color scale interval can be specifically selected as the gradual warm color tone, and the negative color scale interval can be specifically selected as the gradual cold color tone.

In another embodiment, obtaining the visible view of the tropical cyclone track forecast error and the visible view of the tropical cyclone intensity forecast error according to the track forecast verification index and the intensity forecast verification index, and in combination with the geographic information of the tropical cyclone, further comprises the following steps: S32, sorting out the track forecast verification index, the intensity forecast verification index, the geographic information, the actual intensity, and the actual position.

In one embodiment, obtaining the visible view of the tropical cyclone track forecast error and visible view of the tropical cyclone intensity forecast error according to the track forecast verification index and the intensity forecast verification index, and in combination with the geographical information of the tropical cyclone, further comprises the following steps: S33, drawing a full track map of the tropical cyclone at any given time on a first observation map by utilizing the best track of the tropical cyclone and in combination with the geographic information. Specifically, in this embodiment, drawing the full track map of the tropical cyclone at any given time on the first observation map by using the best track of the tropical cyclone in combination with the geographic information includes the following steps: drawing the full track map of a single tropical cyclone in a certain time period on the first observation map according to the best track of the tropical cyclone to obtain the full track map.

In another embodiment, obtaining the visible view of the tropical cyclone track forecast error and visible view of the tropical cyclone intensity forecast error according to the track forecast verification index and the intensity forecast verification index, and in combination with the geographical information of the tropical cyclone, further comprises the following steps: S34, drawing an actual track map of the tropical cyclone on a second observation map by utilizing the best track of the tropical cyclone and in combination with the geographic information. Specifically, in this embodiment, drawing an actual track map of the tropical cyclone on a second observation map by utilizing the best track of the tropical cyclone and in combination with the geographic information includes the following steps: drawing the actual track of one or more tropical cyclones on the second observation map according to the best track of the tropical cyclone, and corresponding the color of the tropical cyclone track to the typhoon intensity grade, so as to obtain the actual track map.

In one embodiment, obtaining the visible view of the tropical cyclone track forecast error and visible view of the tropical cyclone intensity forecast error according to the track forecast verification index and the intensity forecast verification index, and in combination with the geographical information of the tropical cyclone, further comprises the following steps: S35, improving the full track map according to the track forecast verification index and the actual position to obtain the visible view of the tropical cyclone track forecast error, which including the following steps: selecting a forecast agency or forecast method to obtain the forecasted track of the tropical cyclone at the forecast's initial time A; selecting a forecast lead time B, so as to obtain a forecasted position corresponding to the forecast lead time B; connecting the forecasted position and the actual position by different lines to obtain a position error line; marking the date and time corresponding to the forecasted position and the actual position; inserting the name and number of the tropical cyclone, the name of the forecast agency or the forecasting method, and the forecast's initial time A; marking the position error at the forecast lead time B corresponding to the forecast's initial time A, so as to obtain the visible view of the tropical cyclone track forecast error.

In another embodiment, in one embodiment, obtaining the visible view of the tropical cyclone track forecast error and visible view of the tropical cyclone intensity forecast error according to the track forecast verification index and the intensity forecast verification index, and in combination with the geographical information of the tropical cyclone, further comprises the following steps: S36, modifying the actual track map according to the intensity forecast verification index and the actual intensity to obtain the visible view of the tropical cyclone intensity forecast error. Specifically, in this embodiment, modifying the actual track map according to the intensity forecast verification index and the actual intensity to obtain the visible view of the tropical cyclone intensity forecast error includes: on the basis of the visible view of the tropical cyclone intensity forecast error, taking the longitude and latitude corresponding to the best track of the tropical cyclone at the forecast's initial time as the data of the second observation map; the forecast error verification index is used as mapping data, and the size of the forecast error verification index corresponds to the color scale so as to obtain a single variable scatter mapping map with different colors; on the basis of the scatter map, the spatial visible view of the tropical cyclone verification indexes can be obtained by marking the name or number of the tropical cyclone, forecast agency or forecasting method, forecast lead time and statistical values of the verification indexes on the second canvas. Furthermore, in this embodiment, the forecast error verification indexes include track forecast verification indexes and intensity error verification indexes, wherein the track forecast verification can be specifically selected as position error, moving direction error and moving speed error, and the intensity forecast verification can be specifically selected as absolute error, relative error, and trend coincidence rate. The statistical values of the verification indexes include the statistical values of the track forecast verification indexes and the statistical values of the intensity error verification indexes, wherein the statistical values of the track forecast verification indexes include average track forecast error, minimum track forecast error, maximum track forecast error and the like, and the statistical values of the intensity error verification indexes include average absolute error, average relative error, root mean square error, minimum intensity forecast error, maximum intensity forecast error and the like.

In an optional embodiment, this disclosure provides a visualization analysis method of the tropical cyclone forecast verification index data, further comprising the following steps: S4, obtaining a first error and a second error according to the track forecast verification index, and obtaining a joint distribution map of the first error and the second error by using the first error and the second error, wherein the first error is the track error of the tropical cyclone along the forward direction, and the second error is the track error of the tropical cyclone perpendicular to the forward direction.

Figure 3:
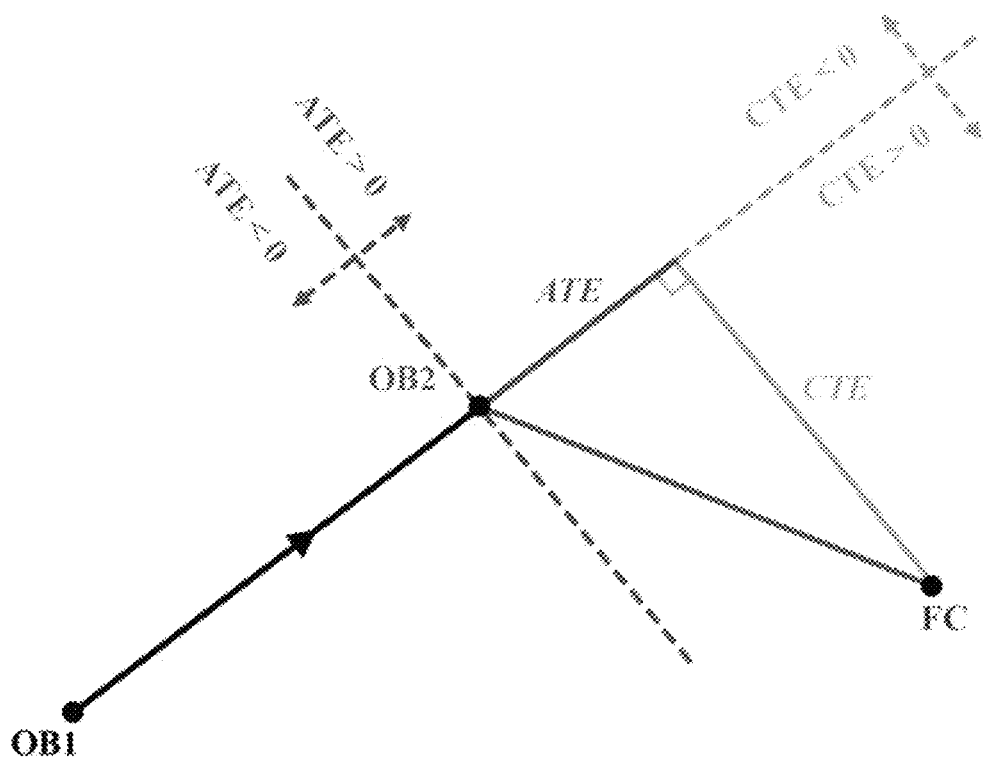
FIG. 3 shows a schematic chart of ATE and CTE solution.

In an optional embodiment, obtaining the first error and the second error according to the track forecast verification index, and obtaining the joint distribution of the first error and the second error by using the first error and the second error, comprises the following steps: S41, obtaining the first error and the second error by calculating the track forecast verification index. Specifically, in this embodiment, please refer to FIG. 3, obtaining the first error and the second error by calculating the track forecast verification index includes the following steps: respectively decomposing the position error in the track forecast verification index into the first error and the second error, wherein the first error and the second error respectively meet the following formula:

$$ATE = \left| \frac{\overrightarrow{OB1\ OB2} \cdot \overrightarrow{OB1\ FC}}{\|\overrightarrow{OB1\ OB2}\|} - \|\overrightarrow{OB1\ OB2}\| \right|;$$

$$CTE = \left| \|\overrightarrow{OB1\ FC}\|^2 - \frac{\left(\overrightarrow{OB1\ OB2} \cdot \overrightarrow{OB1\ FC}\right)^2}{\|\overrightarrow{OB1\ OB2}\|^2} \right|;$$

Wherein ATE is the first error, CTE is the second error, OB1 represents the initial position of the tropical cyclone, FC represents the forecasted position of the tropical cyclone, and OB2 represents the actual position at the corresponding forecast time.

In another optional embodiment, obtaining the first error and the second error according to the track forecast verification index, and obtaining the joint distribution of the first error and the second error by using the first error and the second error, further comprises the following steps: S42, defining the drawing standard of the joint distribution map. Specifically, in this embodiment, the drawing standards of the joint distribution map include the third canvas size, the third horizontal and vertical coordinate, the overall scatter color, the sample scatter color, and the bivariate kernel density estimation contour line. Furthermore, the size of the third canvas can be specifically determined according to the range of the tropical cyclone activities, and the third horizontal and vertical coordinate can define the range and interval of the third horizontal and vertical coordinate according to the maximum and minimum values of the first error and the second error, respectively. The definition of the bivariate kernel density estimation contour line includes: the number of contour lines, the main color of contour lines, and the filling color of contour lines. Specifically, the main color of the contour lines can be specifically selected as blue, and the filling color of the contour line can be specifically defined as the darker the main color, the greater the kernel density.

In yet another optional embodiment, obtaining the first error and the second error according to the track forecast verification index, and obtaining the joint distribution of the first error and the second error by using the first error and the second error, further comprises the following steps: S43, obtaining the joint scatter distribution map of the first error and the second error by using the data distribution of the first error and the second error.

In an optional embodiment, obtaining the first error and the second error according to the track forecast verification index, and obtaining the joint distribution of the first error and the second error by using the first error and the second error, further comprises the following steps: S44, performing bivariate kernel density estimation on the values of the first error and the second error, so as to obtain bivariate kernel density estimation graphs of the first error and the second error. Specifically, in this embodiment, in the third canvas, the layer of the bivariate kernel density estimation graph is located below the layer of the joint scatter distribution map.

In yet another optional embodiment, obtaining the first error and the second error according to the track forecast verification index, and obtaining the joint distribution of the first error and the second error by using the first error and the second error further comprises the following steps: obtaining the first histogram and the second histogram by using the first error and the second error, respectively.

In another optional embodiment, obtaining the first error and the second error according to the track forecast verification index, and obtaining the joint distribution of the first error and the second error by using the first error and the second error, further comprises the following steps: S45, inserting the first histogram and the second histogram into the bivariate kernel density estimation graph, so as to obtain the overall distribution map of the first error and the second error.

In one embodiment, obtaining the first error and the second error according to the track forecast verification index, and obtaining the joint distribution of the first error and the second error by using the first error and the second error, further comprises the following steps: S46, superimposing joint scatter distribution maps of a plurality of the tropical cyclone samples on the overall distribution map, so as to obtain the joint distribution map. Specifically, in this embodiment, according to the joint scatter distribution of the first error and the second error of a plurality of sample tropical cyclones, the scatter points of a plurality of samples can be selected to be distinguished by different colors.

In yet another optional embodiment, this disclosure provides a visualization analysis method of the tropical cyclone forecast verification index data, which further includes the following steps: S5, obtaining a composite box-shaped histogram through the intensity forecast verification index.

In an optional embodiment, the obtaining of the composite box-shaped histogram through the intensity forecast verification index comprises the following steps: S51, defining the drawing standard of the composite box-shaped histogram. Specifically, in this embodiment, the drawing standard of the composite box-shaped histogram includes the fourth canvas size, the fourth horizontal and vertical coordinate, the box-shaped graph attribute, the histogram attribute, the legend of the first target display parameter, the legend of the second target display parameter, and the legend of the third target display parameter. Furthermore, the size of the fourth canvas can be specifically selected according to the range of the tropical cyclone activities, the horizontal coordinate of the fourth horizontal and vertical coordinate can be specifically selected as the number of the tropical cyclone, and the vertical coordinate of the fourth horizontal and vertical coordinate can be specifically selected as the intensity error of the tropical cyclone. The definition of box-shaped graph attribute includes: box width, box line width, box line color, box filling color, the definition of abnormal value shape, and abnormal value filling color. The definition of the histogram includes the width and color of the histogram. Furthermore, the width of the histogram is larger than the width of the box body.

In yet another optional embodiment, the obtaining of the composite box-shaped histogram through the intensity forecast verification index comprises the following steps: S52, obtaining and sorting out the relative error, the average relative error and the average absolute error according to the intensity forecast verification index.

In one embodiment, the obtaining of the composite box-shaped histogram through the intensity forecast verification index comprises the following steps: S53, selecting the relative error as the first target display parameter, the average relative error as the second target display parameter and the average absolute error as the third target display parameter among the relative error, the average relative error, and the average absolute error.

In yet another optional embodiment, the obtaining of the composite box-shaped histogram through the intensity forecast verification index comprises the following steps: S54, obtaining a box-shaped histogram of the tropical cyclone through the first target display parameter and the second target display parameter, and obtaining a histogram of the tropical cyclone through the third target display parameter. Specifically, in this embodiment, obtaining a box-shaped histogram of the tropical cyclone through the first target display parameter and the second target display parameter, and obtaining a histogram of the tropical cyclone through the third target display parameter, comprises the following steps: obtaining the box-shaped histogram of the first target display parameter by using the first target display parameter, obtaining the second target display parameter identifier by using the second target display parameter; combining the box-shaped histogram of the first target display parameter and the second target display parameter identifier to obtain the box-shaped histogram, obtaining the third target display parameter identifier according to the third target display parameter, and adjusting the third target display identifier to obtain the histogram.

In yet another alternative embodiment, the obtaining of the composite box-shaped histogram through the intensity forecast verification index comprises the following steps: S55, superposing the box-shaped graph and the histogram to obtain the composite graph. Specifically, in this embodiment, the second target display parameter identifier layer is placed on the layer of the first target display parameter box-shaped histogram, and the layer of the tropical cyclone box-shaped histogram is on the layer of the histogram.

In an optional embodiment, the obtaining of the composite box-shaped histogram through the intensity forecast verification index comprises the following steps: S56, improving the composite graph to obtain the composite box-shaped histogram. Furthermore, in this embodiment, the improvement of the composite graph to obtain the composite box-shaped histogram includes: marking the name of the forecast agency or forecasting method and the forecast lead time on the fourth canvas, and selecting the statistical values indicating the verification indexes, such as the specific values of median, average relative error, average absolute error, mean square error, maximum value, and minimum value.

Figure 5:
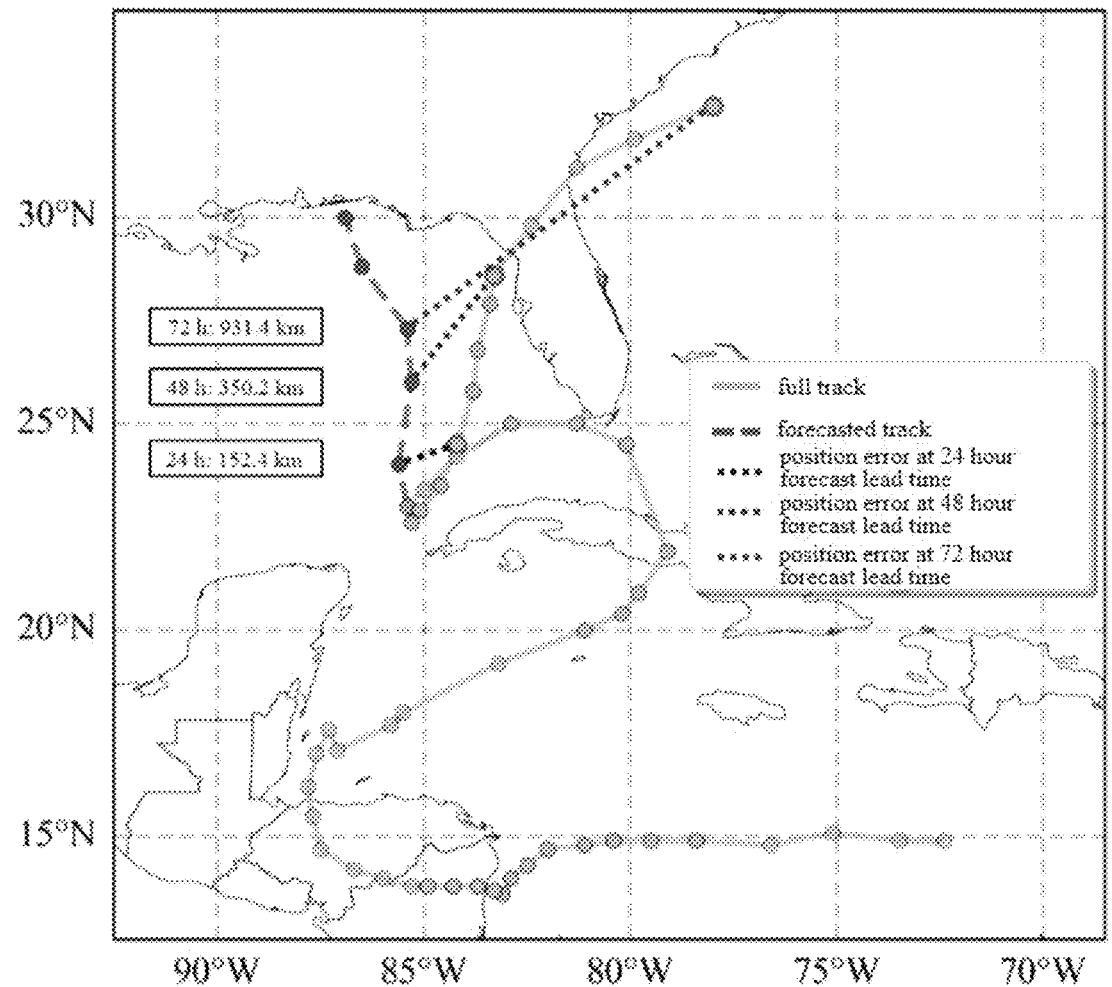
FIG. 5 shows a visual example diagram of the tropical cyclone track forecast error.
Figure 6:
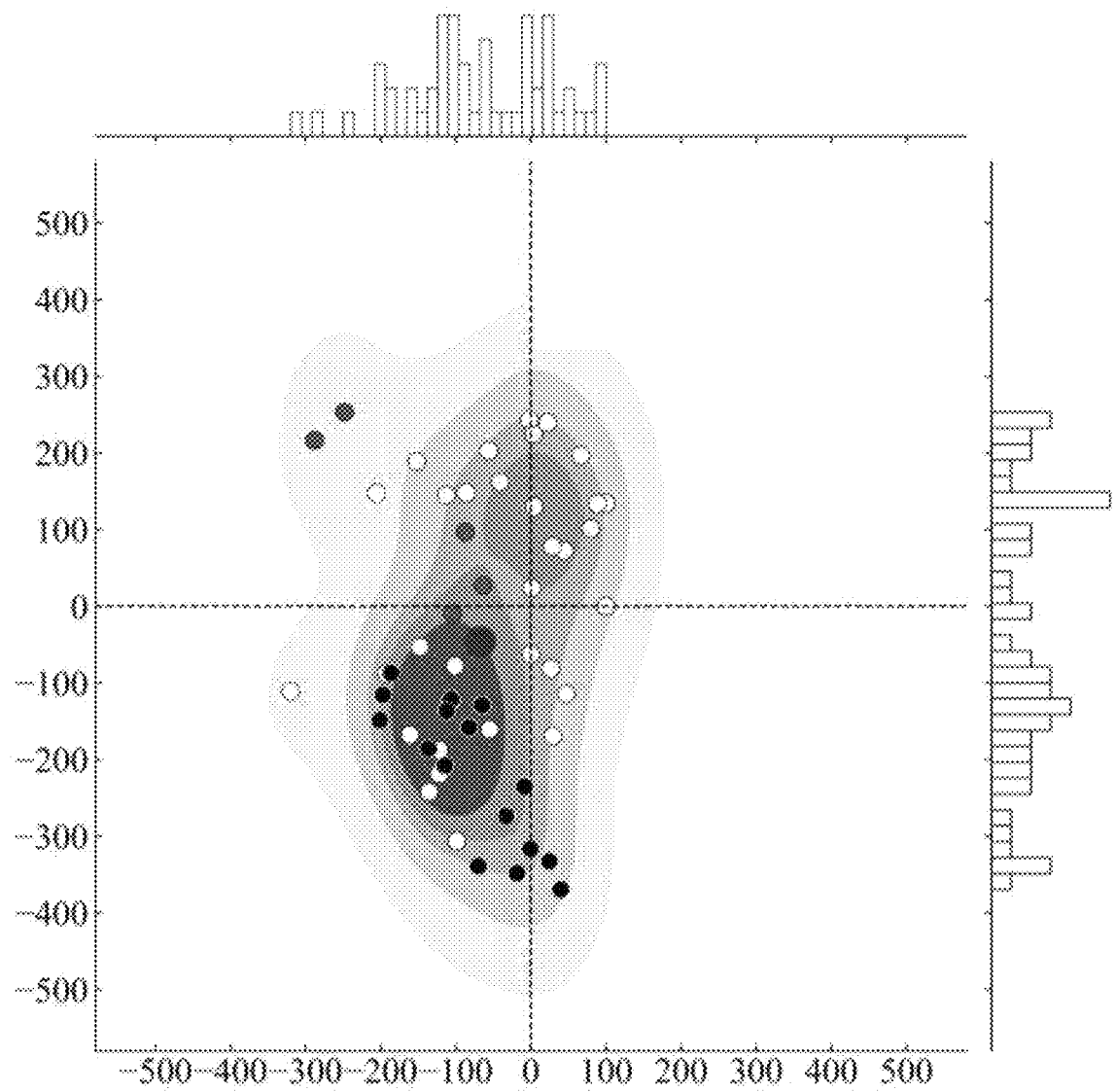
FIG. 6 shows a example diagram of the joint distribution of the first error and the second error.
Figure 7:
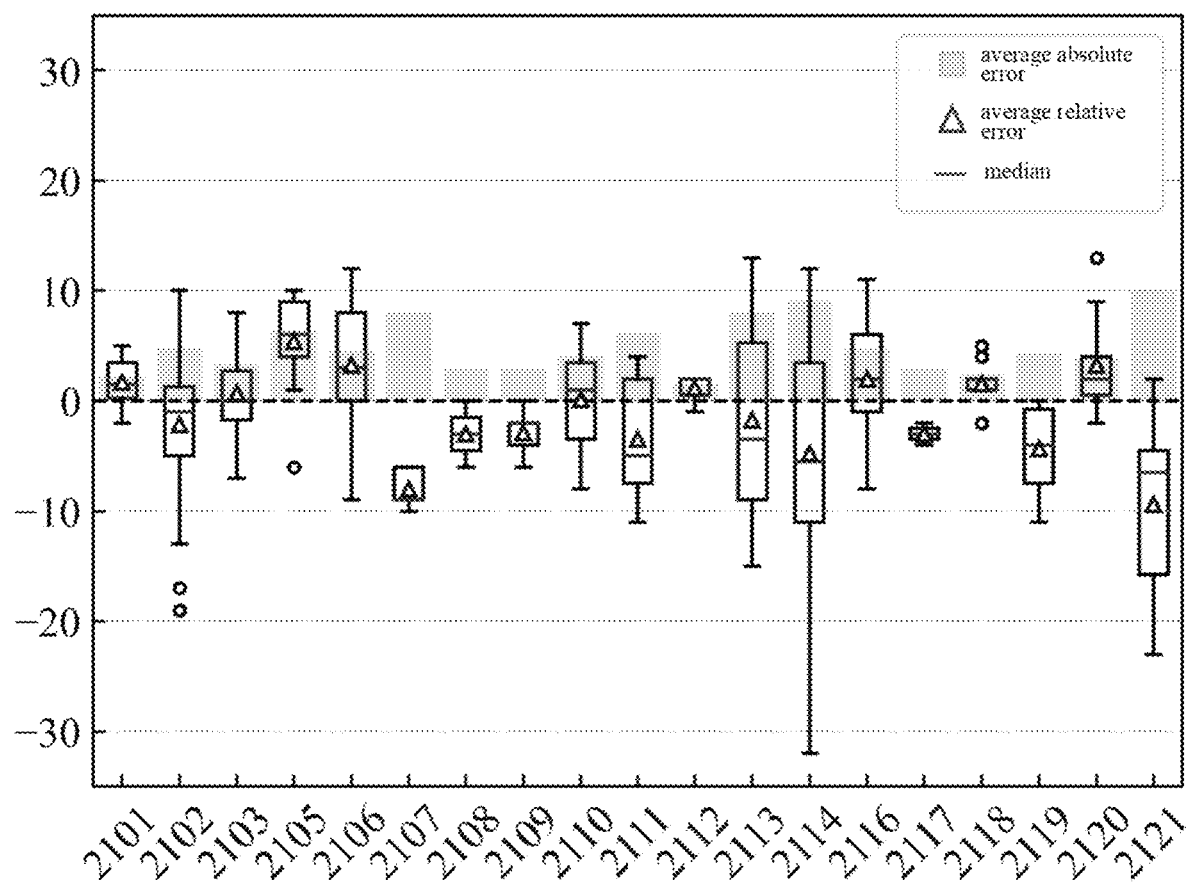
FIG. 7 shows a example diagram of the composite box-shaped histogram.

In one embodiment, please refer to FIGS. 4 to 7. The visual example diagram of the tropical cyclone intensity forecast error shown in FIG. 4, the visual example diagram of the tropical cyclone track forecast error shown in FIG. 5, the example diagram of the joint distribution map of the first error and the second error shown in FIG. 6, and the example diagram of the composite box-shaped histogram shown in FIG. 7 are obtained by using the visualization analysis method of the tropical cyclone forecast verification index data, respectively.

Figure 4:
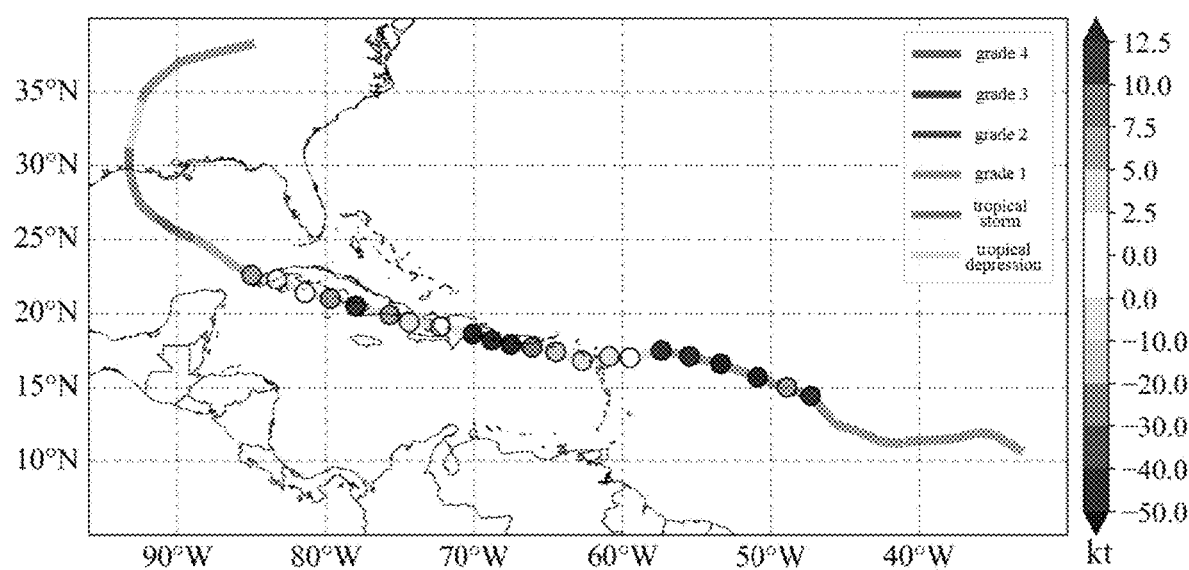
FIG. 4 shows a visual example diagram of the tropical cyclone intensity forecast error.

Specifically, please refer to FIG. 4. In this embodiment, the visual example diagram of the tropical cyclone intensity forecast error shows the spatial visualization of a tropical cyclone intensity forecast error under a certain forecast lead time. The horizontal coordinate is the longitude coordinate, and the vertical coordinate is the latitude coordinate. The position of the dot indicates the position of the tropical cyclone at the forecast's initial time, and the filled color of the dot indicates the size of the verification index corresponding to the forecast's initial time. The line segments with different colors indicate the actual track and actual intensity of the tropical cyclone. The color bar on the right outside of the figure indicates the color scales for the verification index data, and the legend of the typhoon intensity level is in the upper right corner of the figure.

Specifically, please refer to FIG. 5. In this embodiment, the visual example diagram of the tropical cyclone track forecast error shows the visualization of track forecast error with different forecast lead times for a certain forecast method at a certain forecast's initial time.

The horizontal coordinate is the longitude coordinate, and the vertical coordinate is the latitude coordinate. The forecasted track, the position error at each forecast lead time, and the full track are depicted by using curves with different colors and styles. In addition, the explanatory legend of each curve is inserted into the figure, and the position errors of different forecast lead times are marked with detailed data. Furthermore, the position error at 24 hour forecast lead time is 152.4 km, the position error at 48 hour forecast lead time is 350.2 km, and the position error at 72 hour forecast lead time is 931.4 km.

Specifically, please refer to FIG. 6. In this embodiment, the example diagram of the joint distribution of the first error and the second error shows the joint distribution of the first error and the second error under a certain forecast lead time. The horizontal coordinate is the second error, the vertical coordinate is the first error, the dot represents the joint scatter distribution of the overall first error and the second error, and the contour line is the bivariate kernel density estimation distribution of the overall first error and the second error. The right side is the histogram of the overall first error data, and the upper side is the histogram of the overall second error data.

Specifically, please refer to FIG. 7. In this embodiment, the example diagram of the composite box-shaped histogram illustrates the intensity forecast error under a certain forecast lead time, in which the horizontal coordinate is defined as typhoon number, the vertical coordinate is defined as intensity error, the box-shaped graph represents the relative error of intensity forecast, the triangle represents the average relative error, and the histogram represents the average absolute error.

To sum up, this disclosure realizes the expression of index data on the map, and thus obtains the forecasting characteristics and differences of different typhoons in different stages or different climatic zones by different forecasting methods, and obtains the joint distribution of the first error and the second error under the overall data by using the first error and the second error, and highlighting the position error of the sample (i.e. the specified typhoon); while obtaining the composite box-shaped histogram, the box graph and the histogram are combined together by analyzing the quantile value and the mean value to form a composite box-shaped histogram, which not only reflects a plurality of analysis indexes, but also expresses the distribution of error samples and also show the mean value of absolute errors between forecasted values and observed values; moreover, this disclosure optimizes the traditional graphic statistical method by visually analyzing the index data in the spatial dimension, and optimizes the comparability, legibility and comprehensiveness of the index. This document deepens the application and value of the forecast verification system in practical operational forecasting, helps forecasters master the characteristics of forecast errors, improves the accuracy of fine typhoon forecast, and also enhances the influence of China's technical innovation in tropical cyclone forecast verification system. More importantly, this document can open new ideas for various data analysis and can be applied to data analysis in different fields.

So far, specific embodiments of this topic have been described. Other embodiments are within the scope of the appended claims. In some cases, the actions recorded in the claims may be performed in different orders and the desired results may still be achieved. In addition, the processes depicted in the drawings do not necessarily require a particular order or a sequential order shown to achieve the desired results. In some embodiments, multitasking and parallel processing may be advantageous.

Each embodiment in this application is described in a progressive way. The same and similar parts of each embodiment can be referred to each other, and the differences between each embodiment and other embodiments are highlighted.

The expressions "first" and "second" used in various embodiments of this disclosure can modify various target display parameters or errors regardless of the order and/or importance. The above expression is only configured for the purpose of distinguishing the target display parameters or errors from other target display parameters or errors. For example, the first target display parameter and the second target display parameter represent different target display parameters, although both are target display parameters. For example, without departing from the scope of this disclosure, the first target display parameter can be called the second target display parameter, and similarly, the second target display parameter can be called the first target display parameter.

The above description is only an alternative embodiment of this application and an explanation of the applied technical principle. Those skilled in the art should understand that the scope of this document involved in this application is not limited to the technical solutions formed by the specific combination of the above technical features, but also covers other technical solutions formed by any combination of the above technical features or their equivalent features without departing from the above inventive concept. For example, the above features and the technical features disclosed in the application (but not limited to) with similar functions are replaced each other to form a technical solution.

The above are only alternative embodiments of this application and are not intended to limit this application. For those skilled in the art, this application can have various modifications and changes. Any modification, equivalent substitution, improvement, etc. made within the spirit and principle of this application shall be included in the scope of protection of this application.

The invention claimed is:

1. A visualization analysis method of tropical cyclone forecast verification index data, characterized by comprising the following steps:
acquiring, tropical cyclone data;
determining, a track forecast verification index and an intensity forecast verification index of the tropical cyclone, based on the tropical cyclone data;
drawing, a diagram of a tropical cyclone track forecast error and a diagram of a tropical cyclone intensity forecast error, based on the track forecast verification index and the intensity forecast verification index, and in combination with the geographic information of the tropical cyclone;
determining, a first error and a second error, according to the track forecast verification index, and drawing, a joint distribution map of the first error and the second error, by using the first error and the second error; wherein
the first error is a track error of the tropical cyclone along a forward direction, and the second error is a track error of the tropical cyclone perpendicular to the forward direction; and
drawing, a composite box-shaped histogram, based on the intensity forecast verification index;
wherein the determining the track forecast verification index and the intensity forecast verification index based on the tropical cyclone data comprises:
obtaining, an initial position, a forecasted position, a forecasted intensity, an actual position and an actual intensity of the tropical cyclone, by using the tropical cyclone data, wherein the actual position and actual intensity are the actual position and actual intensity of the forecasted position at a corresponding forecast time; and
determining, the track forecast verification index and the intensity forecast verification index, according to the initial position, the forecasted position, the actual position and the actual intensity, respectively;
wherein, the determining the first error and the second error according to the track forecast verification index, and drawing the joint distribution map of the first error and the second error by using the first error and the second error, wherein the first error is the track error of the tropical cyclone along the forward direction, and the second error is the track error of the tropical cyclone perpendicular to the forward direction, comprises:
determining, the first error and the second error, based on the initial position, the forecasted position, and the actual position of the track forecast verification index;
defining, a drawing standard for drawing the joint distribution map;
drawing, a joint scatter distribution map of the first error and the second error, by using data distribution of the first error and the second error;
performing, bivariate kernel density estimation, on values of the first error and the second error, to obtain bivariate kernel density estimation values and to draw a bivariate kernel density estimation graph of the first error and the second error based on the bivariate kernel density estimation values;
drawing, a first histogram and a second histogram, by using the first error and the second error, respectively;
inserting, the first histogram and the second histogram, into the bivariate kernel density estimation graph, thereby obtaining an overall distribution map of the first error and the second error; and
superimposing, a plurality of joint scatter distribution maps of tropical cyclone samples, in the overall distribution map, to obtain the joint distribution map.

2. The visualization analysis method of tropical cyclone forecast verification index data according to claim 1, characterized in that, the tropical cyclone data includes an optimized track of the tropical cyclone, a forecasted track of the tropical cyclone and intensity data of the tropical cyclone.

3. The visualization analysis method of tropical cyclone forecast verification index data according to claim 2, characterized in that, the track forecast verification index data includes position error $\Delta R$, moving direction error $\Delta \alpha$, and moving speed error $\Delta SP$, which are respectively defined by the following formulas:

$$\Delta R = 6371 \times \arccos\{\sin \varphi_F \sin \varphi_R + \cos \varphi_F \cos \varphi_R \cos (\lambda_F - \lambda_R)\};$$

$$\Delta \alpha = \arccos\{(\cos A - \cos B \cdot \cos C)/(\sin B \cdot \sin C)\};$$

$\Delta SP = 6371 \times \{\arccos B - \arccos C\}/\Delta t;$ wherein, $\cos A = \sin \varphi_F \sin \varphi_R + \cos \varphi_F \cos \varphi_R \cos(\lambda_F - \lambda_R);$ $\cos B = \sin \varphi_F \sin \varphi_I + \cos \varphi_F \cos \varphi_I \cos(\lambda_F - \lambda_I);$ $\cos C = \sin \varphi_R \sin \varphi_I + \cos \varphi_R \cos \varphi_I \cos(\lambda_R - \lambda_I);$ wherein A is the initial position $A(\varphi_I, \lambda_I)$: B is the forecasted position $B(\varphi_F, \lambda_F)$, C is the actual position $C(\varphi_R, \lambda_R)$; $\Delta R$ is the position error, that is, the distance between the forecasted position $B(\varphi_F, \lambda_F)$ and the actual position $C(\varphi_R, \lambda_R)$, and the unit of said position error is km; $\Delta \alpha$ is the moving direction error, that is, the included angle between the direction from the initial position $A(\varphi_I, \lambda_I)$ to the forecasted position $B(\varphi_F, \lambda_F)$ and the direction from the initial position $A(\varphi_I, \lambda_I)$ to the actual position $C(\varphi_R, \lambda_R)$, and the unit of the moving direction error is azimuth; where ASP is the moving speed error, that is, the difference between the forecasted moving speed and the actual moving speed of the tropical cyclone, and the unit of the moving speed error is kilometers per hour; Parameter 6371 represents radius of the earth; $\Delta t$ is the forecast time, that is, the time it takes for the tropical cyclone to move from the initial position $A(\varphi_I, \lambda_I)$, to the forecasted position $B(\varphi_F, \lambda_F)$.

4. The visualization analysis method of tropical cyclone forecast verification index data according to claim 2, characterized in that, the intensity forecast verification indexes include absolute error S, average absolute error MAE, relative error S', average relative error 1 root mean square error RMSE and trend coincidence rate PCT, which respectively meet the following formulas:

$S = |I_k - I_{fk}|;$ $MAE = \frac{1}{N} \sum_{k=1}^{N} |I_k - I_{fk}|;$ $S' = I_{fk} - I_k;$ $MRE = \frac{1}{N} \sum_{k=1}^{N} (I_{fk} - I_k);$ $RMSE = \left[\frac{1}{N} \sum_{k=1}^{N} (I_{fk} - I_k)^2\right]^{\frac{1}{2}};$ $PCT = \frac{1}{N} \sum_{k=1}^{N} P_K \times 100\%;$ wherein, $P_K = \begin{cases} 1, & \text{if } (I_k - I_{k0}) \cdot (I_{fk} - I_{fk0}) > 0 \\ 1, & \text{if } (I_k - I_{k0}) = 0 \text{ and } (I_{fk} - I_{fk0}) = 0 \\ 0, & \text{others} \end{cases}$ wherein, $I_k$ represents the actual intensity corresponding to the K-th forecast;

indicates the forecasted intensity corresponding to the K-th forecast; The absolute error is the absolute value of the difference between the actual intensity and the forecasted intensity; N represents the total forecast times; The relative error represents the difference between the forecasted intensity and the actual intensity; The trend coincidence rate indicates the same sign rate of the change of the actual intensity and the change of the forecasted intensity, and the intensity change is subject to the initial time; $P_k$ is the same number rate; $I_{k0}$ represents the actual intensity at the K-th forecast's initial time; $I_{fko}$ represents the forecasted intensity at the K-th forecast's initial time.

5. The visualization analysis method of tropical cyclone forecast verification index data according to claim 4, characterized in that, drawing the composite box-shaped histogram by analyzing and processing the intensity forecast verification index, comprises:
  defining, a drawing standard for drawing the composite box-shaped histogram;
  determining, and sorting out the relative error, the average relative error and the average absolute error according to the intensity forecast verification index;
  selecting, the relative error as the first target display parameter, the average relative error as the second target display parameter, and the average absolute error as the third target display parameter, among the relative error, the average relative error and the average absolute error;
  drawing, a box chart of the tropical cyclone, based on the first target display parameter and the second target display parameter, and drawing, a histogram of the tropical cyclone, based on the third target display parameter;
  superimposing, the box chart and the histogram, to obtain a composite graph; and
  improving, the composite graph, to obtain the composite box-shaped histogram.

6. The visualization analysis method of tropical cyclone forecast verification index data according to claim 2, characterized in that, drawing the diagram of the tropical cyclone track forecast error and the diagram of the tropical cyclone intensity forecast error according to the track forecast verification index and the intensity forecast verification index, and in combination with the geographical information of the tropical cyclone, comprises:
  defining, drawing standards for drawing the diagram of the tropical cyclone track forecast error and the diagram of the tropical cyclone intensity forecast error, respectively;
  sorting out, the track forecast verification index, the intensity forecast verification index, the geographic information, the actual intensity and the actual position;
  drawing, a full track map of the tropical cyclone at any given time on a first observation map, by utilizing the optimized track of the tropical cyclone and in combination with the geographic information;
  drawing, an actual track map of the tropical cyclone on a second observation map, by utilizing the optimized track of the tropical cyclone and in combination with the geographic information;
  improving, the full track map, according to the track forecast verification index and the actual position, to obtain the diagram of the tropical cyclone track forecast error; and
  improving, the actual track map, according to the intensity forecast verification index and the actual intensity, to obtain the diagram of the tropical cyclone intensity forecast error.

7. The visualization analysis method of tropical cyclone forecast verification index data according to claim 6, characterized in that, improving the full track map according to the track forecast verification index and the actual position to obtain the diagram of the tropical cyclone track forecast error, comprises:
  selecting, a forecast agency or forecast method, to obtain the forecasted track of the tropical cyclone at the forecast's initial time A;
  selecting, a forecast lead time B, to obtain a forecasted position corresponding to the forecast lead time B;

connecting, the forecasted position and the actual position by different lines, to obtain a position error line;

marking, the date and time corresponding to the forecasted position and the actual position;

inserting, the name and number of the tropical cyclone, the name of the forecast agency or the forecasting method, and the forecast's initial time A; and marking, the position error at the forecast lead time B corresponding to the forecast's initial time A, to obtain the diagram of the tropical cyclone track forecast error.

8. The visualization analysis method of tropical cyclone forecast verification index data according to claim 1, characterized in that, determining the first error and the second error by calculating the track forecast verification index comprises:

Decomposing, the position error in the track forecast verification index, into the first error and the second error, respectively, wherein the first error and the second error respectively meet the following formula:

$$ATE = \left| \frac{\overrightarrow{OB1\ OB2} \cdot \overrightarrow{OB1\ FC}}{\|\overrightarrow{OB1\ OB2}\|} - \|\overrightarrow{OB1\ OB2}\| \right|;$$

$$CTE = \left| \|\overrightarrow{OB1\ FC}\|^2 - \frac{\left(\overrightarrow{OB1\ OB2} \cdot \overrightarrow{OB1\ FC}\right)^2}{\|\overrightarrow{OB1\ OB2}\|^2} \right|;$$

wherein ATE is the first error, CTE is the second error, OB1 represents the initial position of the tropical cyclone, FC represents the forecasted position of the tropical cyclone, and OB2 represents the actual position at the corresponding forecast time.

\* \* \* \* \*